United States Patent
Mondragon (10) Patent No.: US 11,760,241 B2
(45) Date of Patent: Sep. 19, 2023

(54) SEAT COVER FOR LINEARLY-TUFTED AUTOMOBILE SEATS

(71) Applicant: ADC Solutions Auto, LLC, Costa Mesa, CA (US)

(72) Inventor: Diner Mondragon, Dalton, GA (US)

(73) Assignee: ADC Solutions Auto, LLC, Costa Mesa, CA (US)

( * ) Notice: Subject to any disclaimer, the term of this patent is extended or adjusted under 35 U.S.C. 154(b) by 0 days.

(21) Appl. No.: 17/385,438

(22) Filed: Jul. 26, 2021

(65) Prior Publication Data
US 2022/0041083 A1    Feb. 10, 2022

Related U.S. Application Data

(63) Continuation of application No. 16/425,999, filed on May 30, 2019, now abandoned.

(51) Int. Cl.
*B60N 2/60*    (2006.01)

(52) U.S. Cl.
CPC ................ *B60N 2/6027* (2013.01)

(58) Field of Classification Search
CPC .. B60N 2/6027; B60N 2/6018; B60N 2/5816; B60N 2/60; B60N 2/585; B60N 2/6054; F16G 11/103; F16G 11/046
See application file for complete search history.

(56) References Cited

U.S. PATENT DOCUMENTS

| | | | | |
|---|---|---|---|---|
| 278,097 A | * | 5/1883 | Collins | F16G 11/14 D8/383 |
| 3,953,911 A | * | 5/1976 | Fishack | F16G 11/046 24/130 |
| 4,396,227 A | | 8/1983 | Neilson | |
| 5,307,751 A | * | 5/1994 | Shell | F16G 11/14 24/130 |
| 5,784,763 A | * | 7/1998 | Cassidy | F16G 11/14 24/130 |
| 6,079,780 A | | 6/2000 | Bapst | |
| 6,705,675 B1 | | 3/2004 | Astman et al. | |
| 9,669,742 B1 | | 6/2017 | Bailey | |
| 10,206,444 B1 | | 2/2019 | DeLuca | |
| 2003/0042773 A1 | | 3/2003 | Stiller et al. | |
| 2009/0160230 A1 | | 6/2009 | Yasuda | |
| 2012/0001464 A1 | | 1/2012 | Teoh et al. | |
| 2013/0088054 A1 | | 4/2013 | Atchison | |

\* cited by examiner

*Primary Examiner* — David R Dunn
*Assistant Examiner* — Christopher E Veraa
(74) *Attorney, Agent, or Firm* — Lowenstein Sandler LLP (57) ABSTRACT

A seat covering for a tufted automobile seat cushions has cover sheets adapted to fit over and around the cushions with a plurality of open-ended channels integrated therewith. Each channel is aligned and associated with a tuft of the cushion after the cover sheet has been fitted over and around the cushion. The covering has a plurality one or more straps, each passing loosely through an associated one of the channels and having strap ends extending from each open-end thereof. Pulling the extending strap ends of each strap after the cover has been fitted over and around the cushion causes the strap to be pulled into the associated tuft to cause the cover sheet to conform to the tuft. A fastener allows for simple and organized connection of the pulled strap ends.

16 Claims, 7 Drawing Sheets

SEAT COVER FOR LINEARLY-TUFTED AUTOMOBILE SEATS

RELATED APPLICATION

This is a continuation of copending U.S. patent application Ser. No. 16/425,999 filed May 30, 2019, the entire disclosure of which is expressly incorporated herein by reference.

FIELD OF THE INVENTION

The invention relates to automobile seat covers. More specifically, the invention relates to seat covers which eliminate the problem of "trampoline effect" covered tightened over linearly-tufted or cross-tufted automobile seats.

BACKGROUND

Existing covers for automobile seats lie flat and taut over any depressions and contours (tufting) in the seats, thereby causing the seats to be flat and elastic, rather than cushioning. Such "trampolining" causes the covered seat to look plain and defeats the aesthetic and functional purposes of the tufting. Existing covers tend shift and slip when the user repeatedly gets in and out of the seat. Existing covers are provided with various forms of attachment means, such as elastic straps, hooks, or straps that are tied together after fitting the cover over the seat. Such means are rife with deficiencies. Among other things, elastic straps stretch permanently and become loose, hooks often damage seats, and tied-together straps are unsightly and difficult to remove.

There exists the need for a seat cover for tufted automobile seats which eliminates such trampolining, and such is an object of the invention. There exists the need for a seat cover that holds firm to the seat as the user repeatedly gets in and out, and such is an additional object of the invention. There also exists the need for a simpler and easier-to-install attachment system for seat covers for automobiles, and such is an additional object of the invention.

Further needs and objects exist which are addressed by the present invention will become apparent by the included disclosure of an exemplary embodiment thereof.

SUMMARY OF THE INVENTION

The invention may be exemplified by or practiced using seat covers that have captive but unaffixed straps which align with linear and cross tuft depressions in the seat and are adapted to be pulled tight such that the straps and cover sheet are drawn into the tuft depressions. The invention may be exemplified by or practiced using seat covers that have straps or strings loosely captured within and extending from channels on the inner side of the cover panels, so that when the two ends of a strap or string are pulled tightly and attached together the channels and cover sheet are drawn down into the tuft depressions and the cover sheet then follows the exact contours of the seat, without trampolining. Tightening of the straps or strings pulls the cover into snug fit with the seat, while also pulling the panel down into the tuft depressions. This is advantageous over the prior art for at least the following reasons;

1) The covered seats maintain the aesthetically pleasing tufted appearance.
2) The covered seats maintain the functional advantages of the tufted seat.
3) No "trampoline" is formed over the tuft depressions.
4) The seat covers are more securely affixed to the seat to prevent slipping from repeated use.

The invention may be exemplified by or practiced using a covering for a tufted cushion having a cover sheet adapted to fit over and around the cushion and having one or more channels, each with first and second open-ends, each channel integrated with the cover sheet and aligned and associated with a tuft of the cushion after the cover sheet has been fitted over and around the cushion, and one or more straps, each passing loosely through an associated one of the channels and having first and second strap ends extending from the first and second open ends, respectively. Pulling the extending first and second strap ends of each strap after the cover sheet has been fitted over and around the cushion may cause the strap to be pulled into the associated tuft to cause the cover sheet to conform to the tuft.

The invention may also be exemplified by or practiced using a covering for a tufted automobile seat having one or more cover sheets each adapted to fit over and around one or more cushions of the seat and each having one or more channels, each channel having first and second open-ends, and each channel integrated with an associated one of the cover sheets and aligned and associated with a tuft of one of the cushions after the cover sheet has been fitted over and around the one of the cushions, and one or more straps, each passing loosely through an associated one of the channels and having first and second strap ends extending from the first and second open ends, respectively. Pulling the extending first and second strap ends of each strap after the cover sheet has been fitted over and around the associated cushion may cause the strap to be pulled into the associated tuft to cause the cover sheet to conform to the tuft and the covering to conform to the tufting of the automobile seat.

The invention may also be exemplified by or practiced using a covering for a tufted automobile seat having a cover sheet adapted to fit over and around cushions of the seat and having one or more channels, each channel having first and second open-ends, and each channel integrated with the cover sheet and aligned and associated with a tuft of the cushions after the cover sheet has been fitted over and around the cushions, and one or more straps, each passing loosely through an associated one of the channels and having first and second strap ends extending from the first and second open ends, respectively. Pulling the extending first and second strap ends of each strap after the cover sheet has been fitted over and around the cushions may cause the strap to be pulled into the associated tuft to cause the cover sheet to conform to the tuft and the covering to conform to the tufting of the automobile seat.

Each first strap end may have a fastener. The fastener may have parallel slots for receiving the associated second strap end. Each strap may be from the group comprising fabric strapping, cord, string, plastic line, cable, and wire. Each strap has a strap width and each parallel slot has a slot width smaller than the strap width to receive strap by compression fit. Each channel may be integrated to cover sheet by sewing the cover sheet into a channel, sewing them to the cover sheet, or adhering them to the cover sheet.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

FIG. IA is an exploded front perspective view of a prior art seat cover being attached to a linear tufted front automobile seat;

FIG. 1B is a front perspective view of the prior art seat cover of FIG. IA attached to the seat of FIG. IA;

DETAILED DESCRIPTION OF EXEMPLARY EMBODIMENTS

Figures 1A, 1B:
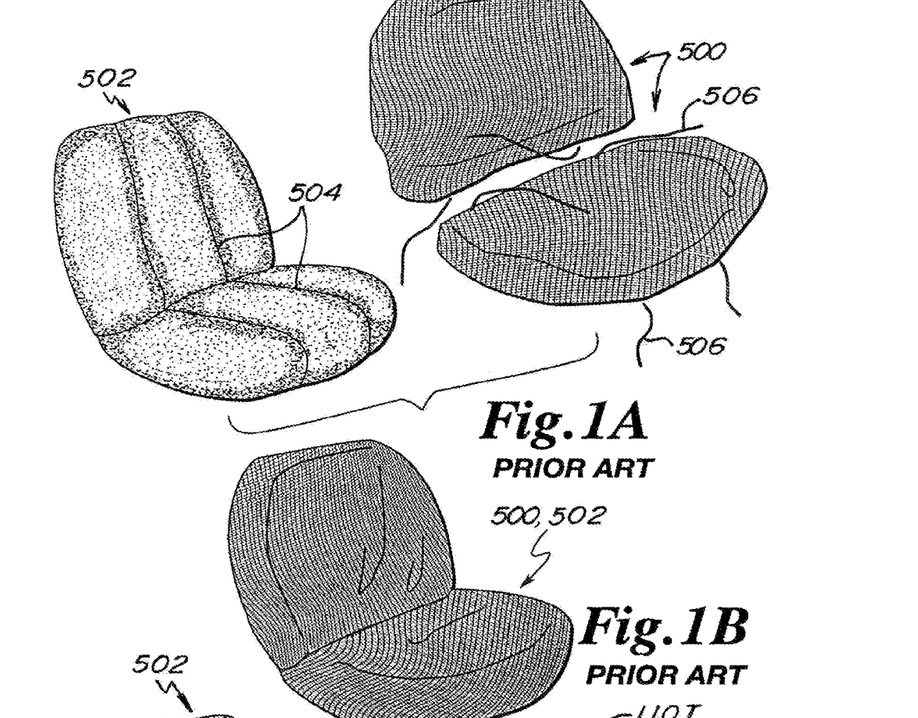
Figure 2:
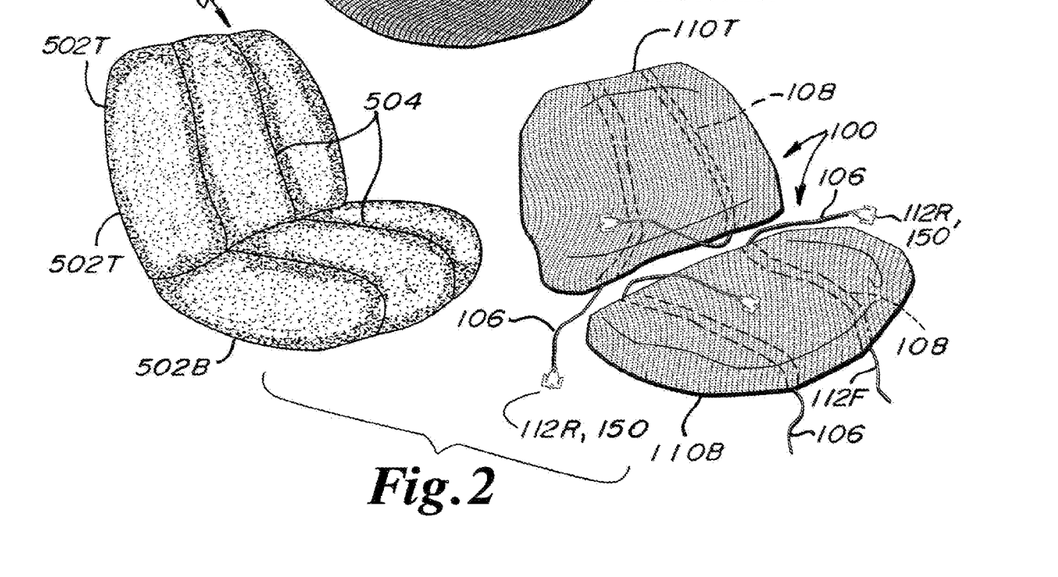
FIG. 2 is an exploded front perspective view of a novel seat cover according to a first embodiment being attached to the linear-tufted front automobile seat of FIG. IA.

Referring to FIGS. IA and IB, a typical prior art seat cover 500 and typical automobile seat 502 are show. It can be seen in FIG. IA that the seat has linearly tufted depressions 504 (tufts). It can also be seen in FIG. IB that after installation, the tufts are gone. These tufts have numerous intended advantages that are thereby lost; including the increased comfort provided by the tufting, the airflow that the tufting enabled between the seat and the sitter, and the aesthetic improvement that the tufting provided. Not shown is the unsightly tying together of the affixing straps 506 behind the seat. Because easily-untieable bows have a tendency to come untied inadvertently, most users tie the straps in "granny knots", which are unlikely to untie inadvertently but are ugly and very difficult to purposely untie in the event that the seat cover is to be removed . . . especially when considering the awkward access to the knots because of their position in the automobile.

FIGS. 2 through 5 show the same tufted seat 502, but now with a seat cover 100 according to a first exemplary embodiment of the invention. It can be readily appreciated from viewing FIG. 5 that the linear tufts 504 of the seat are maintained after installation of seat cover 100.

While the seat cover 100 of the first embodiment employs a two-part arrangement with separate cover sheets 11 OT and 11 OB for the top and bottom automobile seat cushions, respectively, the cover sheet could alternatively be a one-part arrangement, as in the bench seat embodiment 200 described later in this disclosure, wherein a larger cover sheet covers both the top and bottom cushions and also has straps extending from the center of the sheet, tied to a double-fastener 250 that is passed through the gap between the cushions. The straps may be made of fabric strapping, cord, string, plastic line, cable, wire, or any suitable material.

Figures 8, 9:
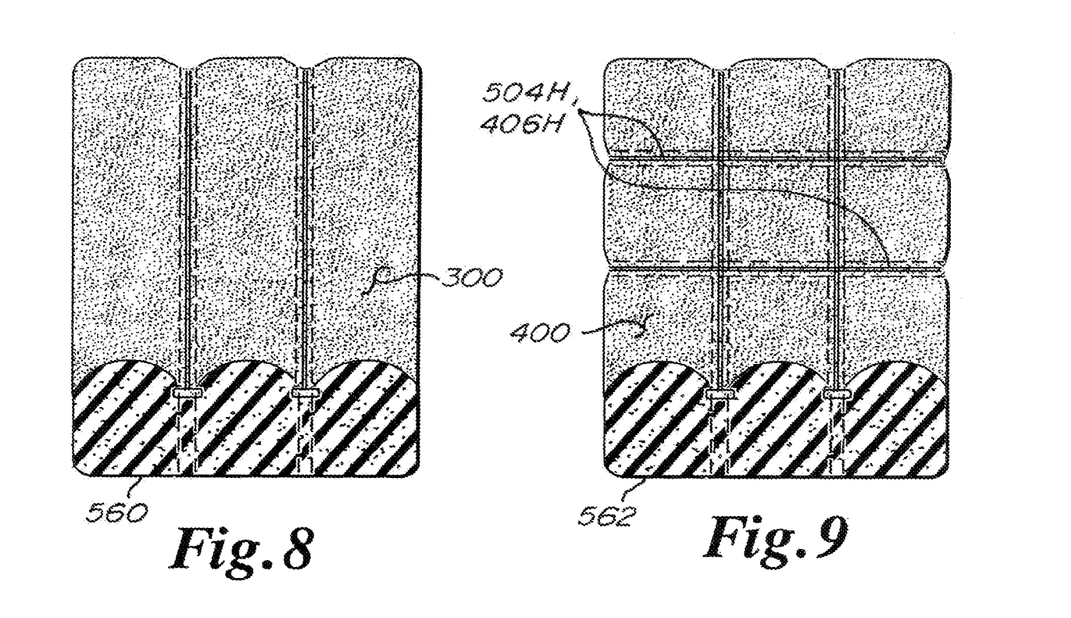
FIG. 8 is a cross sectional view of a linear-tufted automobile seat wearing a novel seat cover according to a second embodiment.
FIG. 9 is a cross sectional view of a cross-tufted automobile seat wearing a novel seat cover according to a third embodiment.
Figure 10:
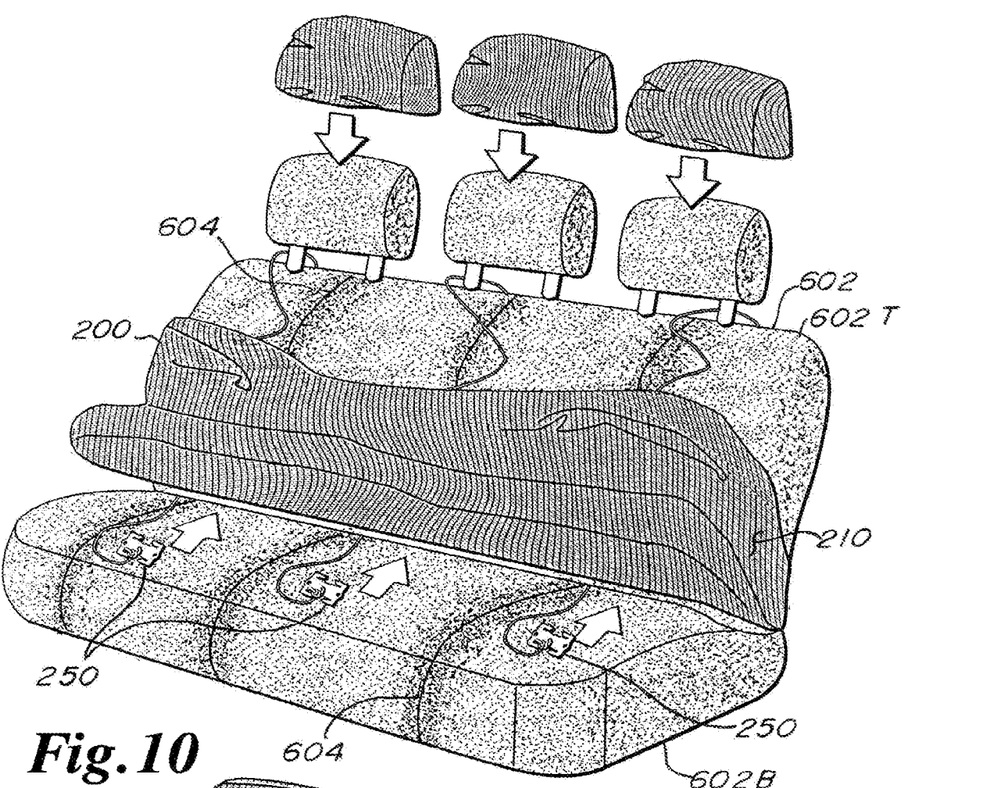
FIG. 10 is a front perspective view of a novel seat cover according to a fourth embodiment being attached to a linear-tufted rear automobile seat.
Figure 11:
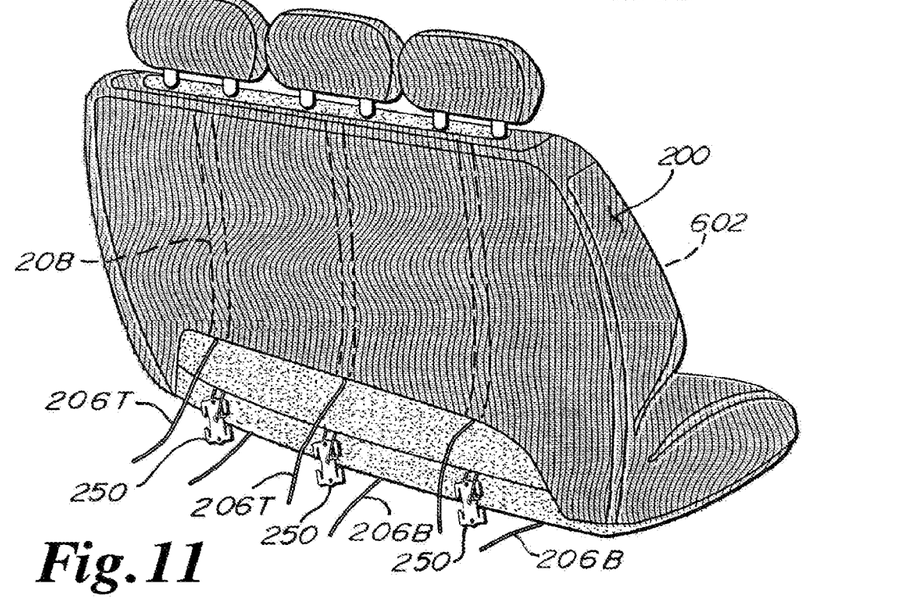
FIG. 11 is a rear perspective view of the seat cover of FIG. 10 being attached to the linear-tufted rear automobile seat of FIG. 10.
Figure 12:
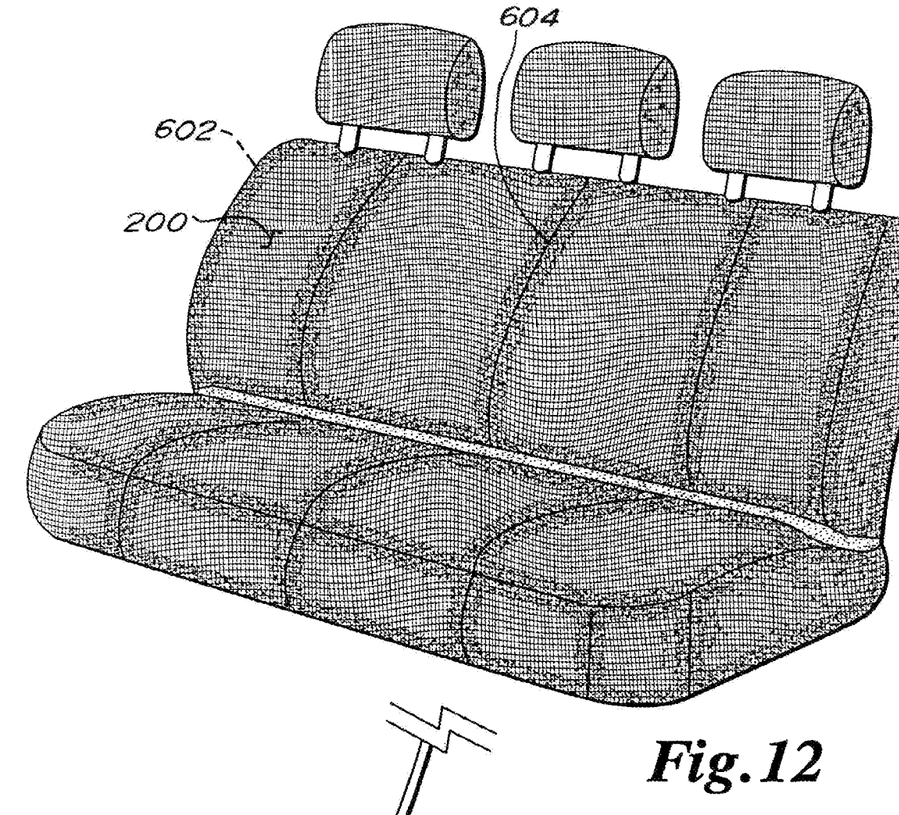
FIG. 12 is a front perspective view of the seat cover of FIG. 10 attached to the linear-tufted rear automobile seat of FIG. 10.

Seat cover 100 is equipped with straps 106 which are positioned to align with the tufts 504 of the seat once the seat cover is installed. A variety of such seat covers would be made available, each with straps in position specifically chosen to align with the tufts of a specific automobile model. For instance, a first automobile model may have three evenly spaced tufts. A second may have four unevenly spaced tufts. A third may have tufts going side-to-side. And a fourth may have both front-to-back and side-to-side tufts (cross-tufting). The purchaser would choose and purchase the seat cover that was intended to fit the seat of his specific automobile model. FIGS. 8 and 9 show typical arrangements for a linear two-tuft seat 560 and cover 300 and a cross-tufted seat 562 and cover 400, respectively. In the cross-tufted seat cover 400, additional horizontal straps 406H are provided to pull the cover sheet into the horizontal tufts 504H.

Figure 7A:
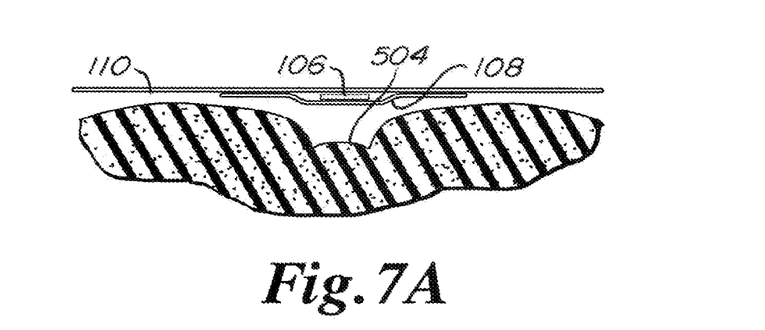
Figure 7B:
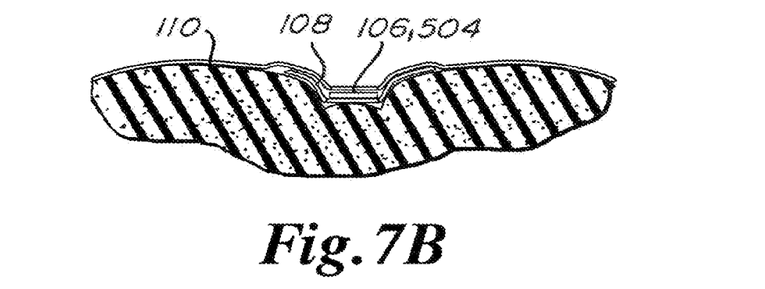
FIG. 7B is a partial cross-sectional view of seat cover of FIG. 7A attached to the seat of FIG. 2.

Referring to FIGS. 7A and 7B, it can be seen that fabric channels 108 are integrated with the cover sheets 110 of the seat cover, and that straps 106 "float" within and unattached to the channels . . . similar to the drawstring of a hooded sweater. Referring back to the bottom cover sheet 11 OB of FIG. 2, it is seen that the ends (forward end I 12F and back end I 12R) extend from the channels and cover sheets. Back ends I 12R have tied or otherwise affixed thereto a novel fastener which will be later described. Pulling of one of the ends at this stage will cause the strap to slide within the channel. Pulling on both ends while the channel is wrapped around something will cause the channel to compress, just as the aforesaid drawstring causes the hood of the aforesaid seater to compress when both ends of the drawstring are pulled.

The straps may be integrated with the cover sheet by any functional means, such as sewing the sheet into a channel, sewing a channel to the sheet, of otherwise adhering a channel to the sheet.

Figures 3, 4, 5:
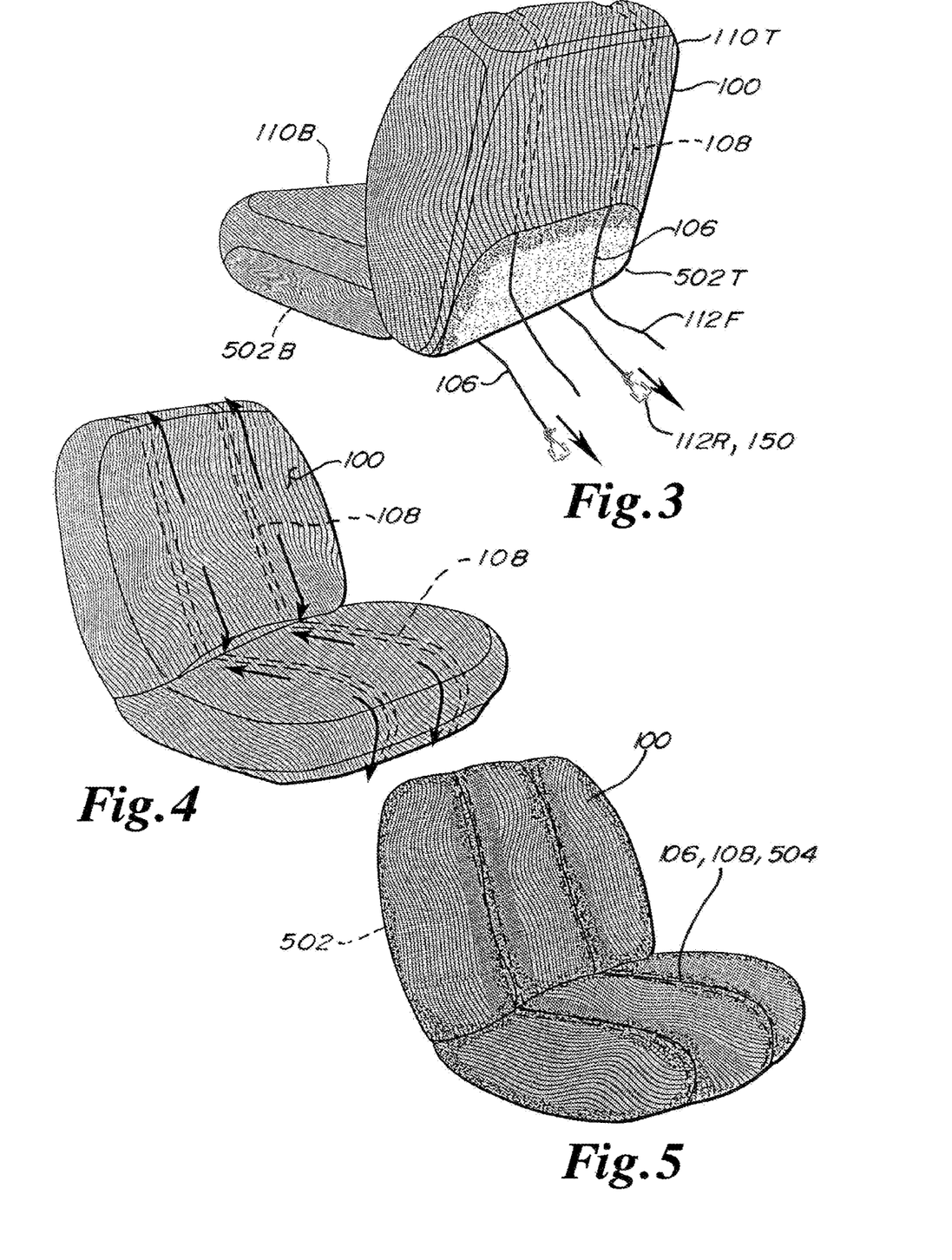
FIG. 3 is a rear perspective view of the seat cover of FIG. 2 being attached to the seat of FIG. IA.
FIG. 4 is a front perspective view of the seat cover of FIG. 2 being attached to the seat of FIG. IA.
FIG. 5 is a front perspective view of the seat cover of FIG. 2 attached to the seat of FIG. IA.

As shown in FIGS. 3 and 4, the initial installation steps of the seat cover is the same as with prior art; the cover sheets I I0T and I IOB are first fitted loosely over the top 502T and bottom 502B cushions, respectively, of the seat, and the ends of each strap are passed either over, under, or between the top and bottom cushions, as applicable, and pulled tightly from behind the seat as a pair to initially snug the cover sheet to the cushion.

Unique to the present seat covers is that, as in FIG. 4, the pulling of the ends of each pair of strap ends pulls the strap, channel, and coversheet down into the tuft with which it is aligned, as in FIG. 5. In FIG. 5 it can be seen that the covered seat mimics the exact tufted shape of the uncovered seat.

In FIGS. 6A through 6E a novel fastener 150 is shown which may be used with seat cover 100 or which may be used in other applications. It is therefore intended that the fastener may be considered a feature of the present invention or may sometimes be useful in other applications as an independent invention on its own. The fastener simplifies seat cover installation, allows for simple and fast removal, and maintains strap organization, making the seat cover more pleasing to the eye.

As initially supplied, a fastener 150 is tied or otherwise permanently affixed to back end 112R of each the strap. The back end with the fastener is fed under or over the automobile seat cushion the position shown in FIG. 6A. FIGS. 6A to 6E show attachment to the seat's top cushion, so the fastener has been fed between the top and bottom seat cushions and the forward strap end I 12F hangs down. For the bottom cover sheet and seat cushion, the orientation of these FIGS. would be flipped upside-down.

Figures 6A, 6B, 6C, 6D, 6E:
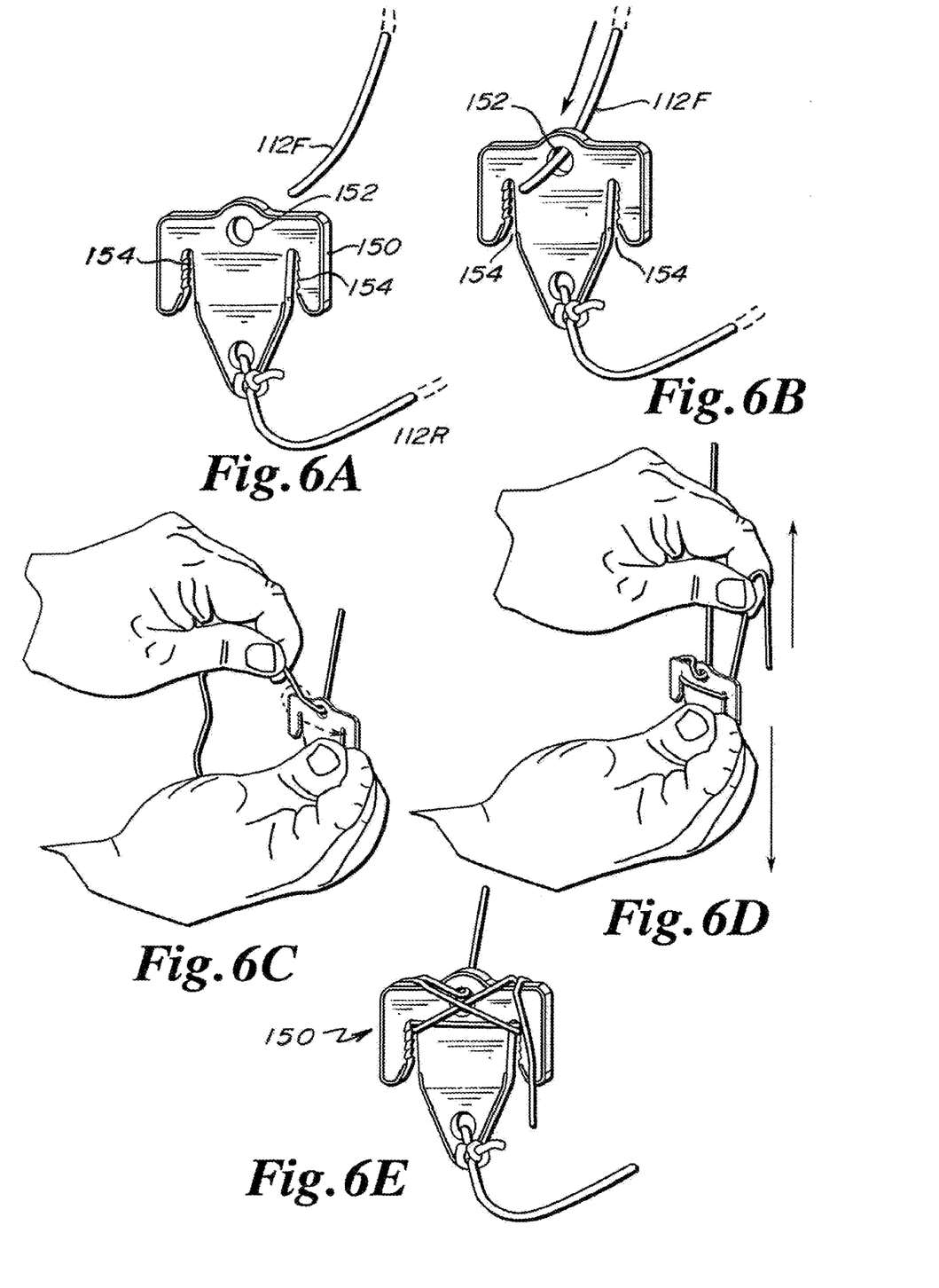
FIGS. 6A through 6E are a sequential series of views of the cord connection system of the seat cover of FIG. 7A is a partial cross-sectional view of the seat cover of FIG. 2 being attached to a linear tufted automobile seat.

As seen in FIG. 6B, the forward end I 12F of the strap is then fed through hole 152 of the fastener.

Referring to FIG. 6C, the forward end of the strap is then pulled taut to secure the coversheet over the top cushion and to pull the strap into the related seat tuft.

As shown in FIG. 6D, the tautly-pulled forward end is then wound around the fastener in an "X" fashion as it is fitted into slots 154, which have a slot width slightly smaller than the width of the strap to tightly grasp the strap by compression fit. FIG. 6E shows the final arrangement.

FIGS. 10 through 14 show a bench seat cover embodiment 200 for use with a tufted automobile bench seat 602. In this case, a single larger cover sheet 210 serves to cover both the top and bottom cushions, 602T and 602B, respectively, of the seat. The seat shown has three linear tufts 604, so there are accordingly three sets of straps 206T and 206B, with associated channels 208 for each the top and bottom seat cushion.

Figure 14:
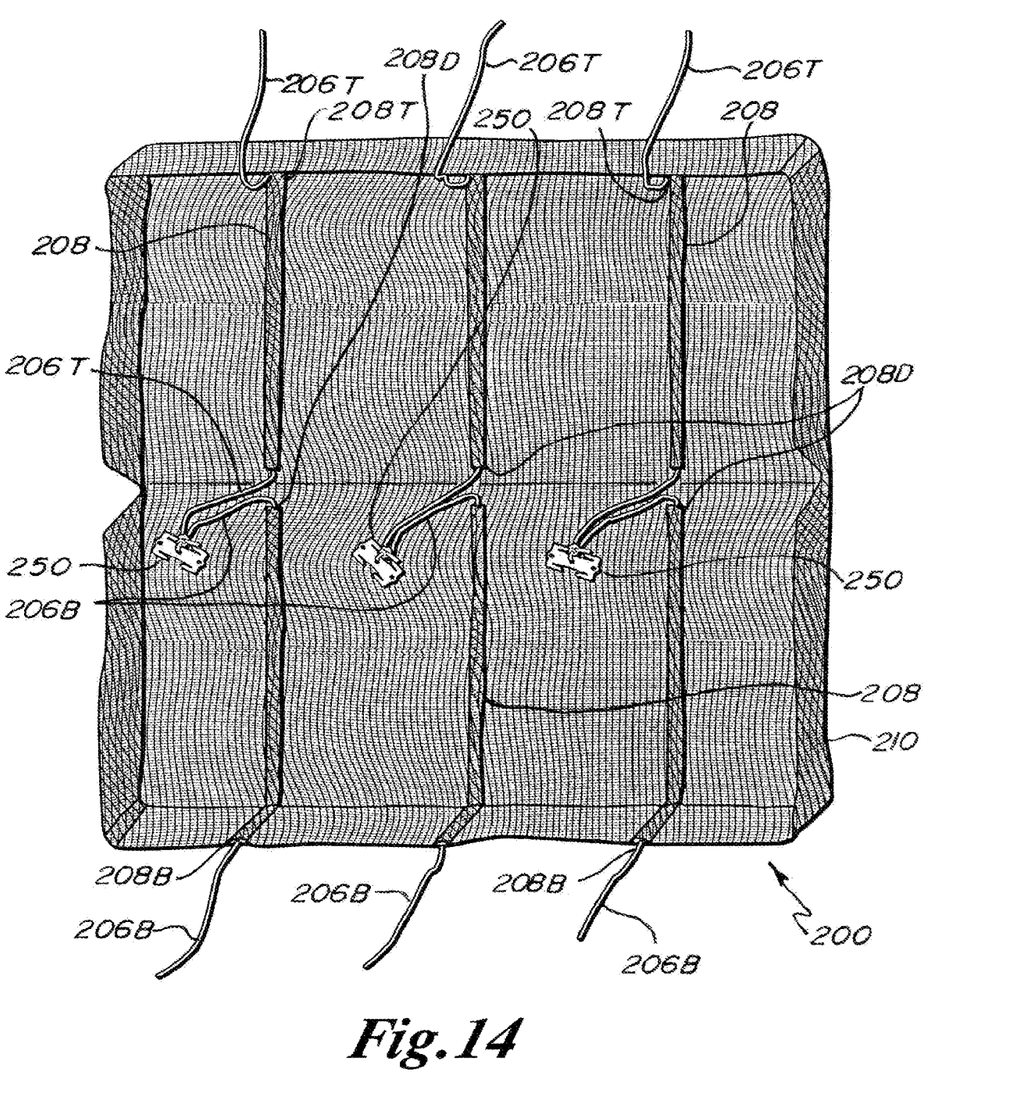
FIG. 14 is an inside view of the seat cover of FIG. 10.

Referring to FIG. 14, which looks at the inside of the seat cover, it can be seen that the channels are discontinued and open midway up the seat cover. This horizonal line of openings 208D corresponds to the gap between the automobile seat's top and bottom cushions. Each top cushion strap 206T extends both from the open top of its channel 208T and from the open discontinuance 208D of its channel, where it has been affixed to double-fastener 250. Each bottom cushion strap 206B extends both from the open bottom of its channel 208B and from the open discontinuance 208D of its channel, where it has also been affixed to the double-fastener.

Figure 13:
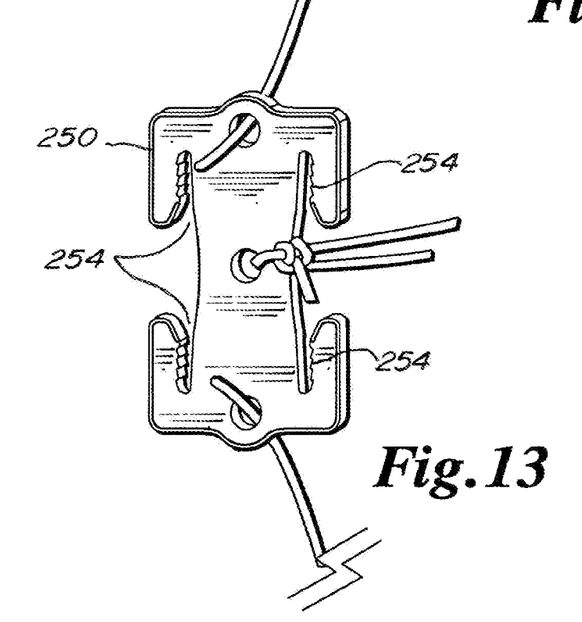
FIG. 13 is a perspective view of the fastener of the seat cover of FIG. 10.

Each double fastener with its affixed strap ends is pushed through the gap between the seat's top and bottom cushions, the cover sheet is draped over the top and bottom cushions, and the strap ends are all pulled to snug the cover to the seat. The double-fastener 250 functions similarly to the single fastener 150 previously described, except has a pair of slots 254 at each end, as shown in FIG. 13, for receiving the strap ends from over the top cushion and under the bottom cushion. The strap ends are then wound around the fastener in "X" fashion while being fitted into the associated slots, just as in the single fastener previously described.

It should be noted that the embodiment shown herein is not intended to limit the scope of the invention. The invention therefore only be limited by the follow claims, including any equivalent interpretation to which they are entitled.

I claim:

1. A covering for a tufted cushion comprising:
    a cover sheet adapted to fit over and around the cushion and having one or more channels, each with first and second open-ends, each channel integrated with the cover sheet and aligned and associated with a tuft of the cushion after the cover sheet has been fitted over and around the cushion;
    one or more straps, each passing loosely through an associated one of the channels and having first and second strap ends extending from the first and second open ends, respectively; whereby pulling the extending first and second strap ends of each strap after the cover sheet has been fitted over and around the cushion causes the strap to be pulled into the associated tuft to cause the cover sheet to conform to the tuft, wherein the cover sheet is adapted to fit loosely over and around the cushion prior to pulling the extending first and second strap ends; and
    for each of the one or more straps, a fastener to secure the first and second strap ends of the strap, the fastener comprising:
        a planar body having a first receiving end and a second receiving end, the first receiving end comprising a first hole for receiving the first strap end and the second receiving end comprising a second hole for receiving the second strap end;
        a first arm disposed at the second receiving end and extending toward the first receiving end to define a first slot between the first arm and the planar body,
        a second arm disposed at the second receiving end and extending toward the first receiving end to define a second slot between the second arm and the planar body, the first arm and second arm being disposed on opposing sides of the planar body such that the first and second slots are parallel to each other.

2. The covering of claim 1 wherein each channel is integrated to cover sheet by sewing the cover sheet into a channel.

3. The covering of claim 1 wherein each channel is integrated to the cover sheet by sewing them to the cover sheet.

4. The covering of claim 1 wherein each channel is integrated to the cover sheet by adhering them to the cover sheet.

5. A covering for a tufted automobile seat comprising:
    one or more cover sheets each adapted to fit over and around one or more cushions of the seat and each having one or more channels;
    each channel having first and second open-ends, and each channel integrated with an associated one of the cover sheets and aligned and associated with a tuft of one of the cushions after the cover sheet has been fitted over and around the one of the cushions; and
    one or more straps, each passing loosely through an associated one of the channels and having first and second strap ends extending from the first and second open ends, respectively; whereby pulling the extending first and second strap ends of each strap after the cover sheet has been fitted over and around the associated cushion causes the strap to be pulled into the associated tuft to cause the cover sheet to conform to the tuft and the covering to conform to the tufting of the automobile seat, wherein the cover sheet is adapted to fit loosely over and around the cushion prior to pulling the extending first and second strap ends,
    wherein each first strap end comprises a fastener, the fastener comprising:
        a planar body having a first receiving end and a second receiving end, the first receiving end comprising a first hole for receiving the first strap end and the second receiving end comprising a second hole for receiving a corresponding second strap end;
        a first arm disposed at the second receiving end and extending toward the first receiving end to define a first slot between the first arm and the planar body, a second arm disposed at the second receiving end and extending toward the first receiving end to define a second slot between the second arm and the planar body, the first arm and second arm being disposed on opposing sides of the planar body such that the first and second slots are parallel to each other.

6. The covering of claim 5 wherein each strap is from the group comprising fabric strapping, cord, string, plastic line, cable, and wire.

7. The covering of claim 6 wherein each strap has a strap width and each parallel slot has a slot width smaller than the strap width to receive strap by compression fit.

8. The covering of claim 7 wherein each channel is integrated to cover sheet by sewing the cover sheet into a channel.

9. The covering of claim 7 wherein each channel is integrated to the cover sheet by sewing them to the cover sheet.

10. The covering of claim 7 wherein each channel is integrated to the cover sheet by adhering them to the cover sheet.

11. A covering for a tufted automobile seat comprising:
a cover sheet adapted to fit over and around cushions of the seat and having one or more channels;
each channel having first and second open-ends, and each channel integrated with the cover sheet and aligned and associated with a tuft of the cushions after the cover sheet has been fitted over and around the cushions; and
one or more straps, each passing loosely through an associated one of the channels and having first and second strap ends extending from the first and second open ends, respectively; whereby pulling the extending first and second strap ends of each strap after the cover sheet has been fitted over and around the cushions causes the strap to be pulled into the associated tuft to cause the cover sheet to conform to the tuft and the covering to conform to the tufting of the automobile seat, wherein the cover sheet is adapted to fit loosely over and around the cushion prior to pulling the extending first and second strap ends, wherein each first strap end comprises a fastener, the fastener comprising:
a planar body having a first receiving end and a second receiving end, the first receiving end comprising a first hole for receiving the first strap end and the second receiving end comprising a second hole for receiving the corresponding second strap end;
a first arm disposed at the second receiving end and extending toward the first receiving end to define a first slot between the first arm and the planar body,
a second arm disposed at the second receiving end and extending toward the first receiving end to define a second slot between the second arm and the planar body, the first arm and second arm being disposed on opposing sides of the planar body such that the first and second slots are parallel to each other.

12. The covering of claim 11 wherein each strap is from the group comprising fabric strapping, cord, string, plastic line, cable, and wire.

13. The covering of claim 12 wherein each strap has a strap width and each parallel slot has a slot width smaller than the strap width to receive strap by compression fit.

14. The covering of claim 13 wherein each channel is integrated to cover sheet by sewing the cover sheet into a channel.

15. The covering of claim 13 wherein each channel is integrated to the cover sheet by sewing them to the cover sheet.

16. The covering of claim 13 wherein each channel is integrated to the cover sheet by adhering them to the cover sheet.

* * * * *